(12) United States Patent
Lee et al.

(10) Patent No.: US 11,494,403 B2
(45) Date of Patent: Nov. 8, 2022

(54) METHOD AND APPARATUS FOR STORING OFF-CHAIN DATA

(71) Applicant: ELECTRONICS AND TELECOMMUNICATIONS RESEARCH INSTITUTE, Daejeon (KR)

(72) Inventors: Chang Hyun Lee, Daejeon (KR); Sung Kee Noh, Daejeon (KR); Hwan Jo Heo, Daejeon (KR); Nam Seok Ko, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 180 days.

(21) Appl. No.: 16/817,961

(22) Filed: Mar. 13, 2020

(65) Prior Publication Data
US 2020/0301944 A1    Sep. 24, 2020

(30) Foreign Application Priority Data
Mar. 18, 2019    (KR) .................. 10-2019-0030770

(51) Int. Cl.
*G06F 16/20* (2019.01)
*G06F 16/27* (2019.01)
*G06F 16/23* (2019.01)
*G06F 16/22* (2019.01)

(52) U.S. Cl.
CPC .......... *G06F 16/27* (2019.01); *G06F 16/2246* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 2017/0193245 A1 | 7/2017 | Youn et al. | |
| 2017/0236123 A1 | 8/2017 | Ali et al. | |
| 2018/0198794 A1 | 7/2018 | Huh et al. | |
| 2019/0081793 A1* | 3/2019 | Martino | G06Q 20/065 |
| 2019/0349733 A1* | 11/2019 | Nolan | G06F 16/1834 |
| 2020/0127814 A1* | 4/2020 | Ma | G06F 16/27 |
| 2020/0226123 A1* | 7/2020 | Nixon | G06F 16/27 |
| 2022/0029815 A1* | 1/2022 | Basu | H04L 9/0836 |

FOREIGN PATENT DOCUMENTS

| | | |
|---|---|---|
| KR | 10-2012-0116898 A | 10/2012 |
| KR | 10-1829995 B1 | 2/2018 |
| KR | 10-1882805 B1 | 7/2018 |
| WO | 2018/126065 A1 | 7/2018 |

* cited by examiner

*Primary Examiner* — Jau Shya Meng
(74) *Attorney, Agent, or Firm* — LRK Patent Law Firm

(57) ABSTRACT

An off-chain data storage method and apparatus for supporting the integrity and capacity scalability of a data object stored in an off-chain storage. The off-chain data storage method includes collecting a plurality of transactions for a plurality of data objects, creating a root transaction on the basis of a Merkle root of a Merkle tree created based on the collected transactions, and storing the root transaction in a blockchain storage.

19 Claims, 4 Drawing Sheets

METHOD AND APPARATUS FOR STORING OFF-CHAIN DATA

CROSS-REFERENCE TO RELATED APPLICATION

This application claims priority to and the benefit of Korean Patent Application No. 10-2019-0030770, filed on Mar. 18, 2019, the disclosure of which is incorporated herein by reference in its entirety.

BACKGROUND

1. Field of the Invention

Various embodiments of the disclosure relate to a technique for storing data in an off-chain storage.

2. Description of Related Art

Blockchain is a new storage structure that ensures the integrity of data and provides availability on the basis of distributed trust without a centralized trust provider. Bitcoin, which is the first blockchain, stores information such as user account balances and inter-account remittance records on the blockchain, thus ensuring the integrity of a coin transaction history without requiring a separate centralized trust provider.

Since the advent of Bitcoin, blockchain has been recognized for its high availability in various fields. As a result, blockchain has been used for storing general-purpose data such as documents, pictures, and videos beyond the storage of a coin transaction history.

The biggest problem when storing general-purpose data on the blockchain is that the capacity of a ledger shared by participating nodes increases thus leading to a decrease in scalability. Even Bitcoin, which stores only simple coin transaction histories, has a ledger capacity of about 200 GB, and in the case of full nodes, a local machine should always maintain 200 GB of data. It is almost impossible to store general-purpose data directly on the blockchain due to the nature of general-purpose data in which just one image may take up several gigabytes.

Off-chain storage has been designed as a data storage method that overcomes the limitation in the capacity of the blockchain. According to this method, actual data is stored on the off-chain outside the blockchain area, and only hash values of the data are stored on the blockchain, thereby ensuring the integrity of the off-chain data through hash value verification. Hash values always have a certain size (e.g., 32 bytes) irrespective of the capacity of data related to the hash values. As representative off-chain storage, Ethereum blockchain may interoperate with an IPFS distributed storage.

However, even the off-chain storage method using Ethereum and IPFS has a problem in scalability. To ensure integrity, one transaction containing a 32-byte hash value of data per data object to be stored to ensure integrity is stored on the blockchain. As the number of data objects increases, the number of transactions that need to be stored increases linearly. Also, when data is deleted or modified, an already written hash value remains in a blockchain, and an updated hash value should be stored as a new transaction, thereby more quickly increasing the capacity of a blockchain ledger.

SUMMARY OF THE INVENTION

Various embodiments of the disclosure are directed to providing an off-chain data storage method and apparatus capable of solving a capacity scalability problem common to existing off-chain data storage techniques.

According to an embodiment of the disclosure, a method of storing off-chain data includes collecting a plurality of transactions for a plurality of data objects, creating a root transaction on the basis of a Merkle root of a Merkle tree created based on the collected transactions, and storing the root transaction in a blockchain storage.

Also, according to an embodiment of the disclosure, an electronic apparatus for storing off-chain data includes an off-chain storage configured to store a plurality of data objects and a processor, wherein the processor is configured to collect a plurality of transactions for the plurality of data objects, create a Merkle tree on the basis of the plurality of transactions, create a root transaction for a Merkle root of the Merkle tree, and store the root transaction in a blockchain storage.

DETAILED DESCRIPTION OF EXEMPLARY EMBODIMENTS

Figure 1:
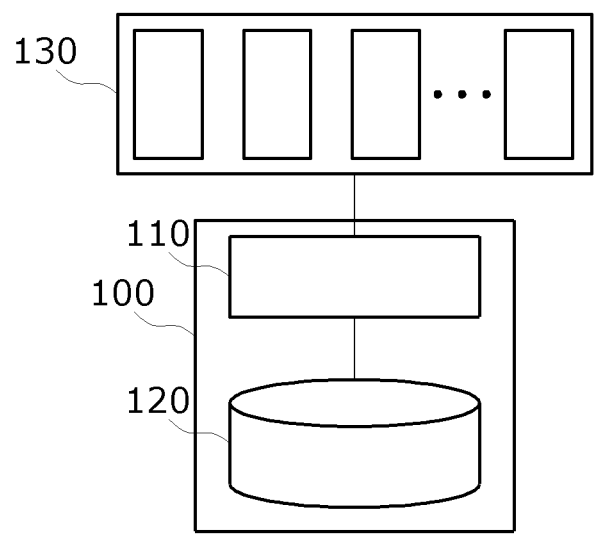
FIG. 1 is a block diagram schematically showing an off-chain data storage apparatus according to an embodiment.

FIG. 1 is a block diagram schematically showing an off-chain data storage apparatus according to an embodiment.

An off-chain data storage apparatus 100 according to an embodiment is an electronic apparatus including a computing device 110 and an off-chain storage 120 configured to store a plurality of data objects.

The computing device 110 includes a processor. The processor is a computation device configured to perform computation using a memory and data stored in the memory according to an instruction. For example, the processor includes various microprocessors such as a central processing unit (CPU).

As an example, the off-chain storage 120 is a local storage device. As another example, the off-chain storage 120 is a remote storage device and is configured to communicate with the computing device 110 over a network. For example, the off-chain storage 120 may be a distributed storage, a self-built storage server, or a storage that utilizes a cloud service.

As an example, the blockchain storage 130 is an on-chain storage built based on a blockchain network.

A data object includes an object such as a document and a file that store general-purpose data such as text, music, images, or videos.

The computing device 110 stores and manages data objects by interoperating the off-chain storage 120 with the blockchain storage 130. That is, the off-chain storage 120 and the blockchain storage 130 constitute an on-chain/off-chain interoperating storage system.

The computing device 110 stores a data object received from a user in the off-chain storage 120 and calculates a hash value of data stored in the data object. For example, the computing device 110 calculates a hash value according to the SHA-256. The computing device 110 transmits the calculated hash value to the blockchain storage 130 in a broadcast manner while the hash value is contained in a new transaction. For example, the computing device 110 may be a miner that creates a block.

In order to ensure the integrity of multiple data objects only using one blockchain transaction record, the computing device 110 configures a Merkle tree having a hash value of each data objects as a leaf node and stores only the root value of the Merkle tree on the blockchain while the root value is contained in a transaction. A Merkle tree value refers to a hash value corresponding to the root of the Merkle tree.

According to an embodiment, when it is assumed that the number of data objects contained in one Merkle tree is n, the number of created transactions and the capacity of a blockchain ledger are decreased to $$\frac{1}{n}$$

compared to the conventional method.

An off-chain data storage method according to the embodiment will be described in detail below.

Figure 2:
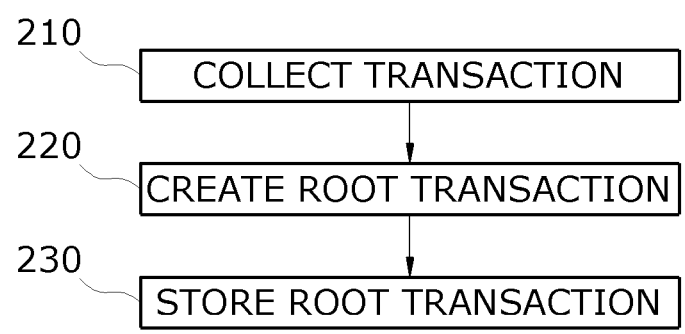
FIG. 2 is a flowchart illustrating a process of an off-chain data storage method according to an embodiment.

FIG. 2 is a flowchart illustrating a process of the off-chain data storage method according to an embodiment.

The off-chain data storage method according to an embodiment includes collecting a plurality of transactions for a plurality of data objects (210), creating a root transaction on the basis of a Merkle root of a Merkle tree created based on the collected transactions (220), and delivering the root transaction to a blockchain storage (230).

In operation 210, the computing device 110 collects a plurality of transactions for a plurality of data objects. As an example, the computing device 110 collects a plurality of transactions that contain a hash value of each data objects.

In operation 210, the computing device 110 collects a plurality of transactions during a specified transaction collection period. The computing device 110 collects a transaction containing a hash value of a data object during the transaction collection period. After the transaction collection period is complete, the computing device 110 performs operation 220 on the basis of the collected transactions and also initiates a new transaction collection period of operation 210.

In an example, the transaction collection period (i.e., a Merkle tree creation period) may vary depending on an operator's policy and the purpose of the off-chain storage 120. As the transaction collection period increases, the number of data objects to be accommodated in one Merkle tree increases, and thus it is possible to effectively reduce the capacity of the blockchain ledger. However, it takes a long time before data stored in a storage is reflected in the blockchain, and thus a decision should be made in consideration of a trade-off between a real-time property and a capacity.

In an example, the transaction collection period may be determined on the basis of at least one of the maximum waiting time and the maximum number of data objects. Here, the maximum number of data objects corresponds to the maximum number of transactions to be accommodated in one Merkle tree. For example, the maximum waiting time may be the longest time to wait before the next data object is received or the longest time to wait before the next Merkle tree is created.

The computing device 110 may determine (or adjust) the transaction collection period using two parameters (or, threshold values), that is, the number of data objects to be included in one root transaction and the maximum waiting time. For example, when a number of data objects (transactions) corresponding to the determined threshold value (first threshold value) related to the number of data objects are collected, the root transaction may be created irrespective of the waiting time after the Merkle tree is created. For example, when the data objects are slowly collected, the creation of the Merkle tree may be started after time-out according to the maximum waiting time (second threshold value). The two threshold values related to the transaction collection period (the first and second threshold values) may be used together with an algorithm for dynamically changing the threshold values while operating a system. That is, the transaction collection period is determined as a function between the current waiting time and the current number of collected data objects within the range of the threshold values. For example, the transaction collection period may be determined on the basis of the number of collected data objects and an estimated time of arrival of a new data object.

Before, after, or simultaneously with operation 210, the computing device 110 stores each data object in the off-chain storage 120. In an example, the computing device 110 may access a data object stored in the off-chain storage 120 using an identifier of the data object. In an example, the identifier of the data object is a hash value of the data object when the data object is stored in the off-chain storage 120.

In operation 220, the computing device 110 may create a Merkle tree on the basis of the transactions collected in operation 210 and may create a root transaction for a Merkle root of the Merkle tree. That is, the computing device 110 creates a new transaction having only the Merkle root included therein to form a transaction block.

In addition, the computing device 110 creates one data object that stores all hash values generated while the Merkle tree is being created in operation 220 and stores the created data object in the off-chain storage 120. Such a data object is referred to as a reference data object. That is, the computing device 110 stores, in the off-chain storage 120, the reference data object for the Merkle tree created in operation 220. Here, the reference data object in the off-chain storage 120 may be accessed using the identifier of the corresponding Merkle tree. In an example, the identifier of the Merkle tree is a Merkle root value stored in the root transaction created in operation 220. For example, the off-chain storage 120 is a distributed hash table. And the computing device 110 may access the reference data object in the off-chain storage 120 using the Merkle root value of the Merkle tree created in operation 220 as a key.

In operation 230, the computing device 110 delivers the root transaction created in operation 220 to the blockchain storage 130. For example, the computing device 110 broadcasts the Merkle root value of the Merkle tree created in operation 220 to a blockchain network while the Merkle root value is contained in the newly created transaction.

Figure 3:
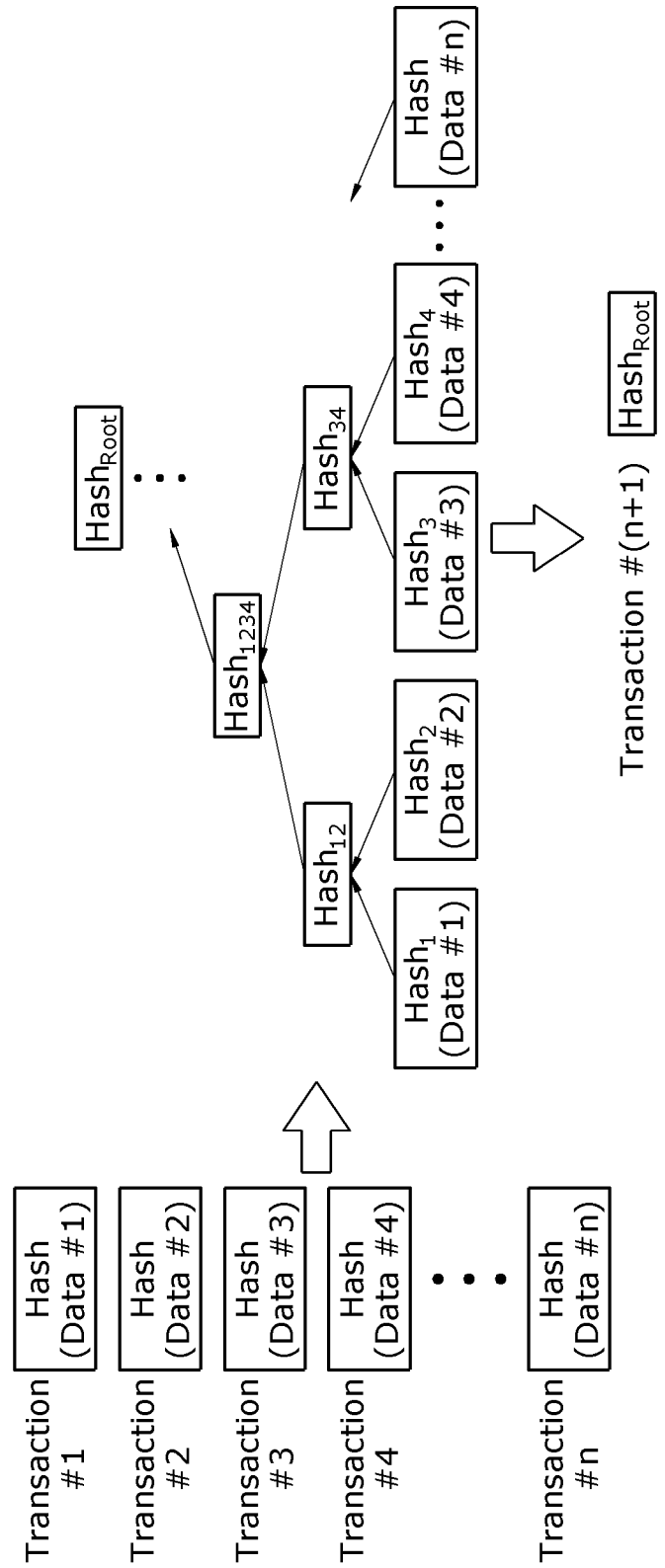
FIG. 3 shows a Merkle tree for a plurality of data objects according to an example.

FIG. 3 shows a Merkle tree for a plurality of data objects according to an example. FIG. 3 illustrates a process of calculating the Merkle root and creating a transaction when # transactions are collected.

The computing device 110 creates a Merkle tree for n transactions (transactions #1 to #n) which contain hash values of n data objects (data #1 to #n), respectively. For example, the computing device 110 determines a hash value of a higher node on the basis of two hash values, when the Merkle tree is configured as below. The computing device 110 may convert each hash value of the two hash value using the little endian method, concatenate result values obtained through the little endian method, perform a hash algorithm on the concatenated result values, and then convert the result values using the big endian method.

The computing device 110 collects transactions containing the hash values of the data objects to create a block. Here, the computing device 110 does not directly use the collected transactions to create a block, but chooses a specific time point, combines transactions collected up to the corresponding time point into one Merkle tree, and calculates a Merkle root ($Hash_{Root}$). The specific time point is determined depending on, for example, the above-described transaction collection period or Merkle tree creation period according the Bitcoin method.

The computing device 110 creates a root transaction (transaction #(n+1)) containing only the calculated Merkle root ($Hash_{Root}$) and contains the created root transaction in the block.

Figure 4:
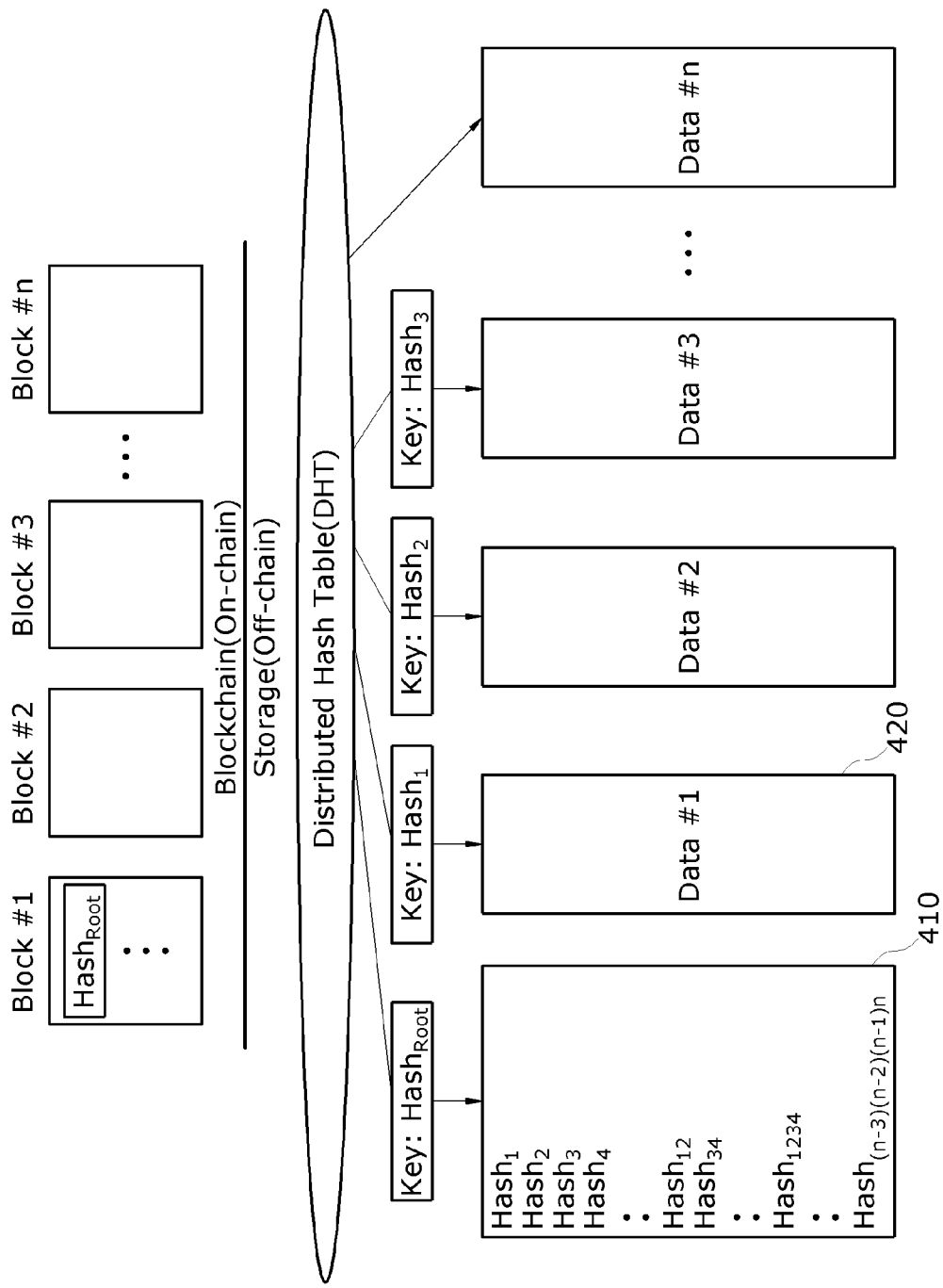
FIG. 4 schematically shows an off-chain storage interoperating with an on-chain storage according to an example.

FIG. 4 schematically shows an off-chain storage interoperating with an on-chain storage according to an example. FIG. 4 illustrates data stored in the off-chain storage 120 and the blockchain storage 130 including a hash value storage part.

Data objects in the off-chain storage 120 are accessed using, for example, a distributed hash table (DHT). Basically, the DHT is a distributed key-value store. Here, the hash values of the data objects are used as keys. As described above, a hash value of a data object in the off-chain storage 120 may be used as an identifier of the corresponding data object.

Box 410 refers to an example reference data object. The key of the reference data object 410, which is a document that stores all hash values used while the Merkle tree is created, is the root of the corresponding Merkle tree, i.e., $Hash_{Root}$.

Box 420 refers to an example data object. The key of the data object 420 is a hash value of the data object 420.

The value of the DHT indicates a physical location where each data object is actually stored in the off-chain storage 120. Location information indicating in which Merkle tree each hash value is stored may be necessary to verify the integrity of the data object to be described below. In an example, such location information may be acquired by storing, in a value field of the DHT, a Merkle root value ($Hash_{Root}$) along with the physical location in which a data object having a corresponding hash value (Key) is stored.

In other words, the off-chain storage 120 stores data object-related information. For example, the data object-related information includes an identifier of a data object, a physical location of a data object, and a Merkle root value of a Merkle tree to which a data object belongs. Here, the identifier of the data object corresponds to Key of the DHT, the physical location of the data object corresponds to Value of the DHT, and the Merkle root value of the Merkle tree corresponds to $Hash_{Root}$.

The blockchain storage 130 stores a transaction (transaction #(n+1)) containing the Merkle root value ($Hash_{Root}$) of the Merkle tree. The integrity of the Merkle root value stored in the blockchain storage 130 is ensured due to the inherent nature of the blockchain. The Merkle root value is utilized to access, manage, and perform integrity verification on the reference data object 410 and the data object 420 stored in the off-chain storage 120.

The reference data object 410 stores hash values of all nodes of the Merkle tree in the off-chain storage 120 in the form of one document for each Merkle root. The Merkle root value stored in the blockchain storage 130 may be used to verify whether hash values stored in the reference data object 410 are modulated, thereby ensuring integrity on its own.

Also, in order to ensure availability of the hash values stored in the reference data object 410, the reference data object 410 is stored in the off-chain storage 120 while a higher replication level is applied to the reference data object 410 than to a general data object 420. That is, the computing device 110 may set the security level of the reference data object 410 to be higher than that of the data object 420.

Figure 5:
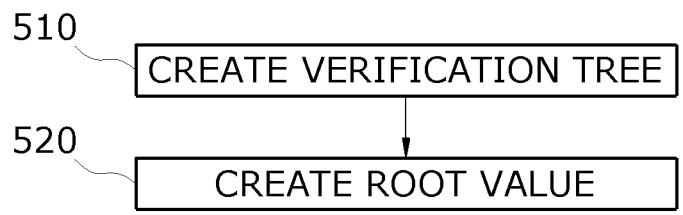
FIG. 5 is a flowchart illustrating a process of verifying the integrity of a plurality of data objects according to an example.

FIG. 5 is a flowchart illustrating a process of verifying the integrity of a plurality of data objects according to an example.

Referring to FIG. 2, in operation 230, a computing device 110 delivers a root transaction, which contains a Merkle root value, to a blockchain storage 130.

Subsequently, if necessary, the computing device 110 verifies the integrity of a plurality of data objects stored in an off-chain storage 120 in operation 510 and operation 520.

In operation 510, the computing device 110 creates a verification tree on the basis of current hash values of the data objects.

In operation 510, the computing device 110 accesses all of the data objects contained in the Merkle tree to be verified in the off-chain storage 120 and calculates the current hash values of the data objects. In the process that has been described with reference to FIGS. 2 and 3, the computing device 110 creates a new Merkle tree, i.e., a verification tree, on the basis of the current hash values and calculates a Merkle root value for the purpose of verification.

In operation 520, the computing device 110 compares the Merkle root value, which is stored in the root transaction, to the root value of the verification tree created in operation 510.

The computing device 110 may perform integrity verification on the data objects included in the Merkle tree by comparing the Merkle root value recorded in the blockchain storage 130 in operation 520 to the root value of the verification tree created in operation 510.

Figure 6:
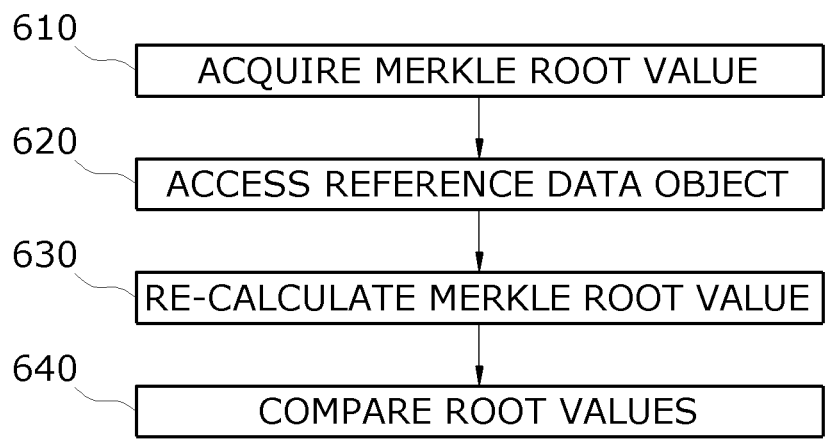
FIG. 6 is a flowchart illustrating a process of verifying the integrity of a data object according to an example.

FIG. 6 is a flowchart illustrating a process of verifying the integrity of a data object according to an example.

In operations 610 to 640, a computing device 110 verifies the integrity of a specific data object stored in an off-chain storage 120.

When the computing device 110 accesses only one specific data object (e.g., Data #1 in FIG. 4) 420 and verifies the integrity of the corresponding data object 420, the Merkle root value ($Hash_{Root}$) alone may not be able to verify whether the data object remains the same as when it was stored. In this case, hash values of leaf nodes and intermediate nodes used in calculating the Merkle root in operation 220 with reference to FIG. 2 are necessary to verify the integrity of Data #1 420. To this end, the computing device 110 stores, in the reference data object 410, the hash values of the leaf nodes used in configuring an initial Merkle tree and calculating a Merkle root and the hash values of the intermediate nodes that are created in the meantime and then contained in the Merkle tree.

In operation 610, the computing device 110 acquires a Merkle root value of a Merkle tree to which a data object, of which integrity is to be verified, belongs. For example, the computing device 110 uses an identifier (e.g., a key) of a data object 420 to acquire the data object 420 and the root value of the Merkle tree to which the data object 420 belongs. In an example, the root value of the Merkle tree may be stored in a DHT.

In operation 620, the computing device 110 accesses the reference data object for the Merkle tree on the basis of the Merkle root value acquired in operation 610. That is, the computing device 110 finds the reference data object 410, which is a document where hash values constituting the Merkle tree are stored, using the Merkle root value acquired in operation 610 as a key.

In operation 630, the computing device 110 re-calculates the Merkle root value on the basis of the hash values stored in the reference data object accessed in operation 620 and a current hash value of a data object to be verified. That is, the computing device 110 re-calculates the Merkle root using the hash values stored in the reference data object 410 accessed in operation 620 and the current hash value of the corresponding data object.

In operation 640, the computing device 110 compares the re-calculated Merkle root value to the Merkle root value stored in the root transaction. The computing device 110 compares the Merkle root value re-calculated in operation 630 to the Merkle root value recorded in the blockchain storage 130 and checks whether the Merkle root values match each other. When checking that the Merkle root values match each other, the computing device 110 may verify the integrity of the corresponding data object 420.

Figure 7:
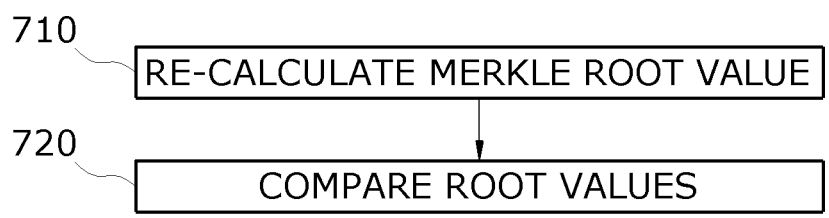
FIG. 7 is a flowchart illustrating a process of verifying the integrity of a reference data object according to an example.

FIG. 7 is a flowchart illustrating a process of verifying the integrity of a reference data object according to an example.

In operation 710 and operation 720, if necessary, a computing device 110 verifies the integrity of a reference data object for a Merkle tree.

In operation 710, the computing device 110 re-calculates the Merkel root value on the basis of the hash values stored in the reference data object 410. For example, the computing device 110 reconfigures the Merkle tree and re-calculates the Merkel root value using the current hash values stored in the reference data object 410.

In operation 720, the computing device 110 compares the re-calculated Merkle root value to the Merkle root value stored in the root transaction. For example, the computing device 110 compares the Merkle root value re-calculated in operation 710 to the Merkle root value recorded in the blockchain storage 130 and checks whether the Merkle root values match each other.

According to an embodiment, a method of storing off-chain data, the method includes collecting a plurality of transactions for a plurality of data objects, creating a root transaction on the basis of a Merkle root of a Merkle tree created based on the collected transactions and storing the root transaction in a blockchain storage.

The method further includes storing the data objects in an off-chain storage, wherein each of the data objects is accessible in the off-chain storage using an identifier of a corresponding data object.

The identifier is a hash value of the corresponding data object at a time point when the data object is stored in the off-chain storage.

The method further includes storing a reference data object for the Merkle tree in an off-chain storage, The reference data object is accessible in the off-chain storage using an identifier of the Merkle tree.

The identifier of the Merkle tree is a Merkle root value stored in the root transaction.

The reference data object is a data object that stores hash values of a leaf node and an intermediate node of the Merkle tree.

The storing comprises setting a security level of the reference data object to be higher than the data objects.

The collecting of the plurality of transactions comprises collecting the plurality of transactions during a collection period determined based on at least one of maximum number of data objects and maximum waiting time of the Merkle tree.

The method further includes verifying the integrity of the plurality of data objects, wherein the verifying comprises creating a verification tree on the basis of a current hash value of each of the data objects; and comparing a Merkle root value stored in the root transaction to the root value of the verification tree.

The method further includes verifying the integrity of each of the data objects, wherein the verifying comprises: acquiring a Merkle root value of the Merkle tree to which each of the data objects belongs; accessing a reference data object for the Merkle tree on the basis of the acquired Merkle root value; re-calculating a Merkle root value on the basis of a current hash value of each of the data object and a hash value stored in the reference data object; and comparing the re-calculated Merkle root value to a Merkle root value stored in the root transaction.

The method further includes verifying the reference data object for the Merkle tree, wherein the verifying comprises: re-calculating a Merkle root value on the basis of a hash value stored in the reference data object; and comparing the re-calculated Merkle root value to a Merkle root value stored in the root transaction.

According to an embodiment, an electronic apparatus for storing off-chain data, the electronic apparatus includes an off-chain storage configured to store a plurality of data objects; and a processor, wherein the processor is configured to: collect a plurality of transactions for the plurality of data objects; create a Merkle tree on the basis of the plurality of transactions and create a root transaction for a Merkle root of the Merkle tree; and store the root transaction in a blockchain storage.

The processor is configured to store the data objects in an off-chain storage; and access the data objects using identifiers of the data objects, and each of the identifiers is a hash value of corresponding data object at a time point when the corresponding data object is stored in the off-chain storage.

The processor is configured to store a reference data object for the Merkle tree in the off-chain storage and access the reference data object using an identifier of the Merkle tree, and the identifier is a Merkle root value stored in the root transaction.

The off-chain storage stores information related to each of the data objects, and the information includes identifiers of each of the data objects, physical locations of each of the data objects, and Merkle root values of Merkle trees to which each of the data objects belong.

Meanwhile, the off-chain data storage method and apparatus according to the above-described embodiments may be implemented by a computer system or may be recorded in a recording medium. The computer system may include at least one processor, memory, user input device, data communication bus, user output device, and storage. The above-described elements perform data communication through the data communication bus.

The computer system may further include a network interface coupled to a network. The processor may be a central processing unit (CPU) or a semiconductor device for processing instructions stored in a memory and/or a storage.

The memory and storage may include various types of volatile or non-volatile storage media. For example, the memory may include a read-only memory (ROM) and a random access memory (RAM).

The off-chain data storage method according to an embodiment of the disclosure may be implemented in a computer-executable manner. When the off-chain data storage method according to an embodiment of the disclosure is performed in a computer device, computer-readable instructions may perform the off-chain data storage method according to the present invention.

Meanwhile, the off-chain data storage method according to the disclosure may be implemented as computer-readable code on a computer-readable recording medium. The computer-readable recording medium includes any type of recording medium in which data that can be decrypted by a computer system is stored. For example, the computer-readable recording medium may include a ROM, a RAM, a magnetic tape, a magnetic disk, a flash memory, an optical data storage device, and the like. Further, the computer-readable recording media can be stored and carried out as codes that are distributed in a computer system connected to a computer network and that are readable in a distributed manner.

According to various embodiments of the disclosure, by storing general-purpose data on a blockchain in an off-chain scheme, it is possible to significantly reduce the capacity of the ledger of the blockchain. Thus, it is possible to store more general-purpose data in the blockchain storage having the same size.

The present invention has been described above with respect to embodiments thereof. Those skilled in the art should understand that various changes in form and details may be made therein without departing from the essential characteristics of the present invention. Therefore, the embodiments described herein should be considered from an illustrative aspect rather than from a restrictive aspect. The scope of the present invention should be defined not by the detailed description but by the appended claims, and all differences falling within a scope equivalent to the claims should be construed as being encompassed by the present invention.

What is claimed is:

1. A method of storing off-chain data, the method comprising:
   collecting a plurality of transactions for a plurality of data objects;
   creating a root transaction on the basis of a Merkle root of a Merkle tree created based on the collected transactions; and
   storing the root transaction in a blockchain storage,
   wherein the collecting of the plurality of transactions comprises collecting the plurality of transactions during a collection period determined based on at least one of maximum number of data objects and maximum waiting time of the Merkle tree.

2. The method of claim 1, further comprising:
   storing the data objects in an off-chain storage,
   wherein an identifier of each of the data objects is used to access each of the data objects in the off-chain storage.

3. The method of claim 2, wherein the identifier is a hash value of a corresponding data object at a time point when the corresponding data object is stored in the off-chain storage.

4. The method of claim 1, further comprising:
   storing a reference data object for the Merkle tree in an off-chain storage,
   wherein an identifier of the Merkle tree is used to access the reference data object in the off-chain storage.

5. The method of claim 4, wherein the identifier of the Merkle tree is a Merkle root value stored in the root transaction.

6. The method of claim 4, wherein the reference data object is a data object that stores hash values of a leaf node and an intermediate node of the Merkle tree.

7. The method of claim 4, wherein the storing comprises setting a security level of the reference data object to be higher than security levels of the data objects.

8. The method of claim 4, further comprising:
   verifying the reference data object for the Merkle tree,
   wherein the verifying comprises:
   re-calculating a Merkle root value on the basis of a hash value stored in the reference data object; and
   comparing the re-calculated Merkle root value to a Merkle root value stored in the root transaction.

9. The method of claim 1, further comprising:
   verifying integrity of the plurality of data objects,
   wherein the verifying comprises:
   creating a verification tree on the basis of a current hash value of each of the data objects; and
   comparing a Merkle root value stored in the root transaction to a root value of the verification tree.

10. A method of storing off-chain data, the method comprising:
    collecting a plurality of transactions for a plurality of data objects;
    creating a root transaction on the basis of a Merkle root of a Merkle tree created based on the collected transactions;
    storing the root transaction in a blockchain storage; and
    verifying integrity of each of the data objects,
    wherein the verifying comprises:
    acquiring a Merkle root value of the Merkle tree to which each of the data objects belongs;
    accessing a reference data object for the Merkle tree on the basis of the acquired Merkle root value;
    re-calculating a Merkle root value on the basis of a current hash value of each of the data object and a hash value stored in the reference data object; and
    comparing the re-calculated Merkle root value to a Merkle root value stored in the root transaction.

11. An electronic apparatus for storing off-chain data, the electronic apparatus comprising:
    an off-chain storage configured to store a plurality of data objects; and
    a processor, and a memory to store instructions, the instructions being executed by the processor to:
    collect a plurality of transactions for the plurality of data objects;
    create a Merkle tree on the basis of the plurality of transactions and create a root transaction for a Merkle root of the Merkle tree;
    store the root transaction in a blockchain storage;
    store the data objects in the off-chain storage; and
    access the data objects using identifiers of the data objects,
    wherein each of the identifiers is a hash value of a corresponding data object at a time point when the corresponding data object is stored in the off-chain storage.

12. The electronic apparatus of claim 11,
wherein the instructions are further executed by the processor to:
store a reference data object for the Merkle tree in the off-chain storage; and
access the reference data object using an identifier of the Merkle tree,
wherein the identifier of the Merkle tree is a Merkle root value stored in the root transaction.

13. The electronic apparatus of claim 12, wherein the reference data object is a data object that stores hash values of a leaf node and an intermediate node of the Merkle tree.

14. The electronic apparatus of claim 12, wherein the instructions are further executed by the processor to, when storing the reference data object for the Merkle tree in the off-chain storage, set a security level of the reference data object to be higher than security levels of the data objects.

15. The electronic apparatus of claim 12, wherein the instructions are further executed by the processor to verify the reference data object for the Merkle tree,
wherein the verifying comprises:
re-calculating a Merkle root value on the basis of a hash value stored in the reference data object; and
comparing the re-calculated Merkle root value to a Merkle root value stored in the root transaction.

16. The electronic apparatus of claim 11,
wherein the off-chain storage stores information related to each of the data objects,
wherein the information includes identifiers of each of the data objects, physical locations of each of the data objects, and Merkle root values of Merkle trees to which each of the data objects belongs.

17. The electronic apparatus of claim 11, wherein the instructions are further executed by the processor to collect the plurality of transactions during a collection period determined based on at least one of maximum number of data objects and maximum waiting time of the Merkle tree.

18. The electronic apparatus of claim 11, wherein the instructions are further executed by the processor to verify integrity of the plurality of data objects,
wherein the verifying comprises:
creating a verification tree on the basis of a current hash value of each of the data objects; and
comparing a Merkle root value stored in the root transaction to a root value of the verification tree.

19. The electronic apparatus of claim 11, wherein the instructions are further executed by the processor to verify integrity of each of the data objects,
wherein the verifying comprises:
acquiring a Merkle root value of the Merkle tree to which each of the data objects belongs;
accessing a reference data object for the Merkle tree on the basis of the acquired Merkle root value;
re-calculating a Merkle root value on the basis of a current hash value of each of the data object and a hash value stored in the reference data object; and
comparing the re-calculated Merkle root value to a Merkle root value stored in the root transaction.

* * * * *